United States Patent [19]

Holland et al.

[11] 4,288,411

[45] Sep. 8, 1981

[54] PROCESS FOR THE SELECTIVE PRODUCTION OF A PLURALITY OF INDIVIDUAL PURE HALIDES AND/OR HALIDE MIXTURES FROM A MIXTURE OF SOLID OXIDES

[76] Inventors: Gerhard Holland; Rudolf Nowak, both of Westendstrasse 18a, D 6000 Frankfurt am Main, Fed. Rep. of Germany

[21] Appl. No.: 63,514

[22] Filed: Aug. 3, 1979

[30] Foreign Application Priority Data

Aug. 4, 1978 [DE] Fed. Rep. of Germany ....... 2834165

[51] Int. Cl.³ .............................................. C01B 9/00
[52] U.S. Cl. .................................. 423/1; 423/76; 423/135; 423/149; 423/343; 423/491; 423/492; 423/494; 423/495; 75/112; 75/113; 423/137; 423/496
[58] Field of Search .................. 423/76, 135, 137, 149, 423/343, 337, 491, 492, 493, 494, 495, 496, 592, 613, 624, 625, 633, 1

[56] References Cited

U.S. PATENT DOCUMENTS

| | | | |
|---|---|---|---|
| 2,733,983 | 2/1956 | Daubenspeck | 423/149 |
| 2,758,019 | 8/1956 | Daubenspeck | 423/149 |
| 3,244,509 | 4/1966 | Nowak | 423/149 |
| 3,466,169 | 9/1969 | Nowak | 423/149 |
| 3,853,541 | 12/1974 | Othmer | 423/149 |
| 4,096,234 | 6/1978 | Martin | 423/495 |

OTHER PUBLICATIONS

Othmer et al. "Halogen Affinities—A New Ordering of Metals to Accomplish Difficult Separations", *AICKE Journal* (vol. 18, No. 1), Jan. 1972, pp. 217-220.

*Primary Examiner*—Brian E. Hearn
*Attorney, Agent, or Firm*—Learman & McCulloch

[57] ABSTRACT

The process is based on the series of halide-forming affinities. The oxides are passed through a series of zones equal in number to the plurality of halides or mixtures which are to be produced. A halide of an element of lower halide-forming affinity is fed countercurrent to the oxides. The halide supply is in stoichiometric equivalent to the total content of halide to be extracted. The oxide of the said fed element is also extracted.

17 Claims, 4 Drawing Figures

PROCESS FOR THE SELECTIVE PRODUCTION OF A PLURALITY OF INDIVIDUAL PURE HALIDES AND/OR HALIDE MIXTURES FROM A MIXTURE OF SOLID OXIDES

The invention relates to a process for the selective production of a plurality of individual pure halides and/or a mixture of halides from a mixture of solid oxides, e.g. simple and complex ores, roasted residues, slag, wastes, minerals, and more specifically, the products and residues of halogenation reactions. These halides are extracted by means of a halide-metallurgical process with few stages using reducing-halogenation, preferably with no or only one single stage of reducing halogenation. The invention is also concerned, using the known series of halide-forming affinities, with the production of pure oxides and/or mixtures of oxides from the halides so obtained.

The halide-forming affinity of an element is understood to be the difference between the halogen potential of its halide or oxy-halide and the oxygen potential of its oxide. The discovery of the chloride-forming affinity series was published in German Pat. No. 1,243,165 corresponding to the U.S. Pat. No. 3,466,169. The series of bromide-forming affinities has also been published since then.

For example, if tin dioxide powder and aluminium trichloride vapour are mixed vigorously at 1,100° K., tin tetrachloride vapour and aluminium oxide powder are formed according to the following equations:

(s) . . . solid;
(g) . . . gaseous

The reactions proceed in this manner because the chloride-forming affinity of tin is greater than that of aluminium.

Oxyhalides can be formed in the same way, e.g. those of vanadium, phosphorus and chromium. As an example, if silicon tetrafluoride vapour is passed into molten vanadium pentoxide at 1,000° K., silicon dioxide powder and vanadium oxyfluoride vapour are formed because the fluoride-forming affinity of vanadium is greater than that of silicon:

(l) . . . liquid

In the conversion of oxides using halides to give the corresponding halides or oxyhalides on the one hand and oxides on the other, there is always an oxygen-halogen exchange. This principle has already been utilised in the following processes:

1. Process for the production of pure iron chloride (German Pat. No. 1,136,722; U.S. Pat. No. 3,244,509).
2. Process for the production of pure metallic chlorides (German Pat. No. 1,243,165; U.S. Pat. No. 3,466,169).
3. Process for the production of titanium halides, synthetic rutile and elementary iron (U.S. Pat. No. 3,859,077).
4. Process for the production of aluminium sub-halides to enable the extraction of elementary aluminium from oxide material (U.S. Pat. No. 3,793,003).

To produce pure iron chloride (German Pat. No. 1,136,722), iron oxide bearing material is, in principle, mixed with carbon and reacted with the quantity of chlorine corresponding to the amount of iron in the feed material. This reducing chlorination results in a mixture of gaseous chlorides which is then brought into contact with an additional quantity of feed material but now without the presence of carbon. In this way an oxygen-chlorine exchange occurs (corresponding to the chloride-forming series) between the solid iron oxide of the feed material and the gaseous non-ferrous chlorides from the reducing chlorination so that gaseous ferric chloride is formed while the non-ferrous chlorides are reoxidised to the corresponding oxides. The solid non-ferrous oxides from this "oxidising chlorination" are then again reducing chlorinated with carbon and chlorine when, as a result of the chlorine stoichiometry a fraction of this non-ferrous oxide is left over as a chlorination residue. The process thus depends on a "combined reducing and oxidising chlorination". This process can naturally only be used for mixtures of oxides in which iron is the metal with the largest chloride-forming affinity.

The known process for the selective production of a plurality of individual pure chlorides from oxide material (German Pat. No. 1,243,165) depends on first subjecting this material to a combined reducing and oxidising chlorination in which the chloride is produced of that metal which has the greatest chloride-forming affinity of all the metal present in the feed material. The chlorination residue is then again subjected to a combined reducing-oxidising chlorination in which the chloride is produced of that metal which now has the greatest chloride-forming affinity of the metals left in the feed material, and so on.

This process for the selective production of a plurality of individual chlorides has the technical and economic disadvantage that a complete chamber must be constructed and operated to carry out the combined reducing and oxidising chlorination required to produce each such chloride. Under certain conditions, the individual chlorides are contaminated by the chlorides of elements present in the reducing agent, e.g. iron chloride from metallurgical coke.

In the proposed process for producing titanium halides, synthetic rutile and elementary iron (U.S. Pat. No. 3,859,077), material containing titanium oxide and iron oxide is mixed in a chamber with carbon and is subjected to a reducing chlorination with chlorine and titanium tetrachloride, whereby as a result of the oxygen-chlorine exchange, gaseous ferric chloride is formed and a titanium-rich solid product-rutile-heavily contaminated with carbon is obtained. This carbon-containing synthetic rutile is reducing chlorinated in a second chamber with the ferric chloride and chlorine whereupon ostensibly elementary iron, titanium dioxide and titanium tetrachloride are formed. Fractions of titanium tetrachloride and synthetic rutile can be removed from between the two chambers.

This process thus consists of two stages exclusively of reducing chlorination carried out in counter-current flow. However, at the given high temperatures—as a result of natural processes—not only titanium tetrachloride but also significant fractions of titanium sub-chlorides are formed, and as a result of the effect of titanium chloride on the iron, gaseous ferric chloride and an iron-titanium alloy are formed. Because of the double reducing chlorination, this process requires an uneconomically high quantity of carbon and a very costly unit just to produce finally titanium tetrachloride contaminated with ferric chloride, and/or low grade synthetic rutile and an inevitably poor quality titanium-containing iron product.

The proposed process for the production of aluminium from material containing aluminium oxide and iron oxide (U.S. Pat. No. 3,793,003) consists of three stages. In the middle stage, aluminium monochloride is formed by a reducing chlorination from aluminium oxide mixed with carbon and a gaseous chloride (e.g. silicon tetrachloride) and/or chlorine. The necessary gaseous chloride (e.g. silicon tetrachloride) must likewise be generated in a reducing chlorination with carbon and chlorine.

The gaseous mixture of oxides of carbon and aluminium monochloride is then supposed to dissociate on cooling to aluminium and gaseous aluminium trichloride which is used in the first stage for the oxidising chlorination of the ore thereby producing gaseous iron chloride and aluminium oxide.

The process thus consists of one stage of oxidising chlorination and two stages of reducing chlorination. The plant required for this is very costly, apart from the fact that, as a result of the presence of carbon monoxide and carbon dioxide during the cooling and dissociation of aluminium monochloride, the aluminium formed is re-oxidised to aluminium oxide releasing elementary carbon.

Thus, apart from other deficiencies, all known processes for producing a plurality of halides from a mixture of solid oxides have the technical and economic disadvantage that one reducing chlorination chamber is required for the production of each individual halide.

In contrast to the state of the art, it has now been discovered that a plurality of individual pure halides and/or mixtures of halides can be produced without reducing halogenation or with only one stage of it from mixtures of solid oxides using the halide-forming affinity series and the principle of counter-current flow.

Processes according to the invention are described in the following specification and illustrated in the accompanying drawings wherein.

Figure 1:
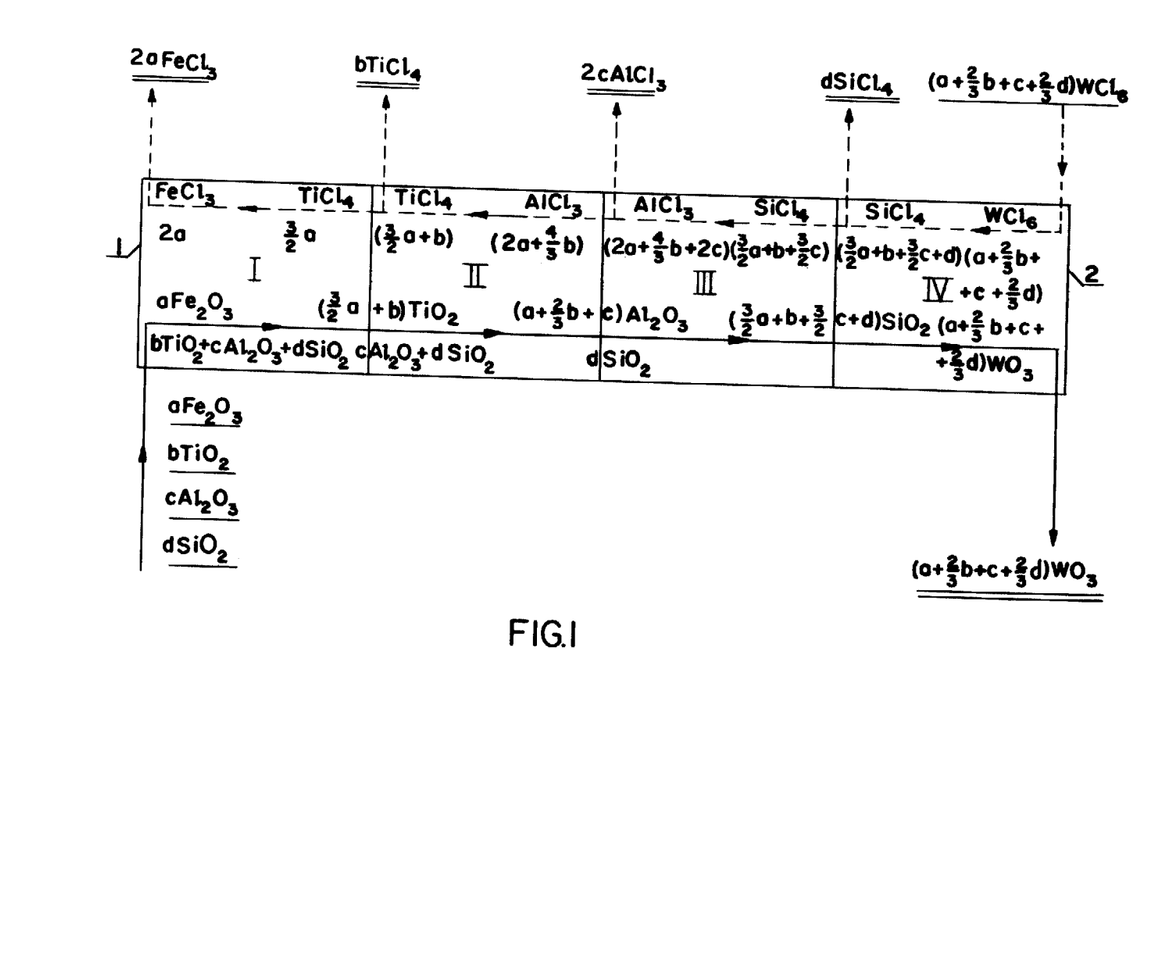
FIG. 1 is a schematic diagram of horizontally oriented apparatus having four zones for practicing the invention according to one embodiment.
Figure 2:
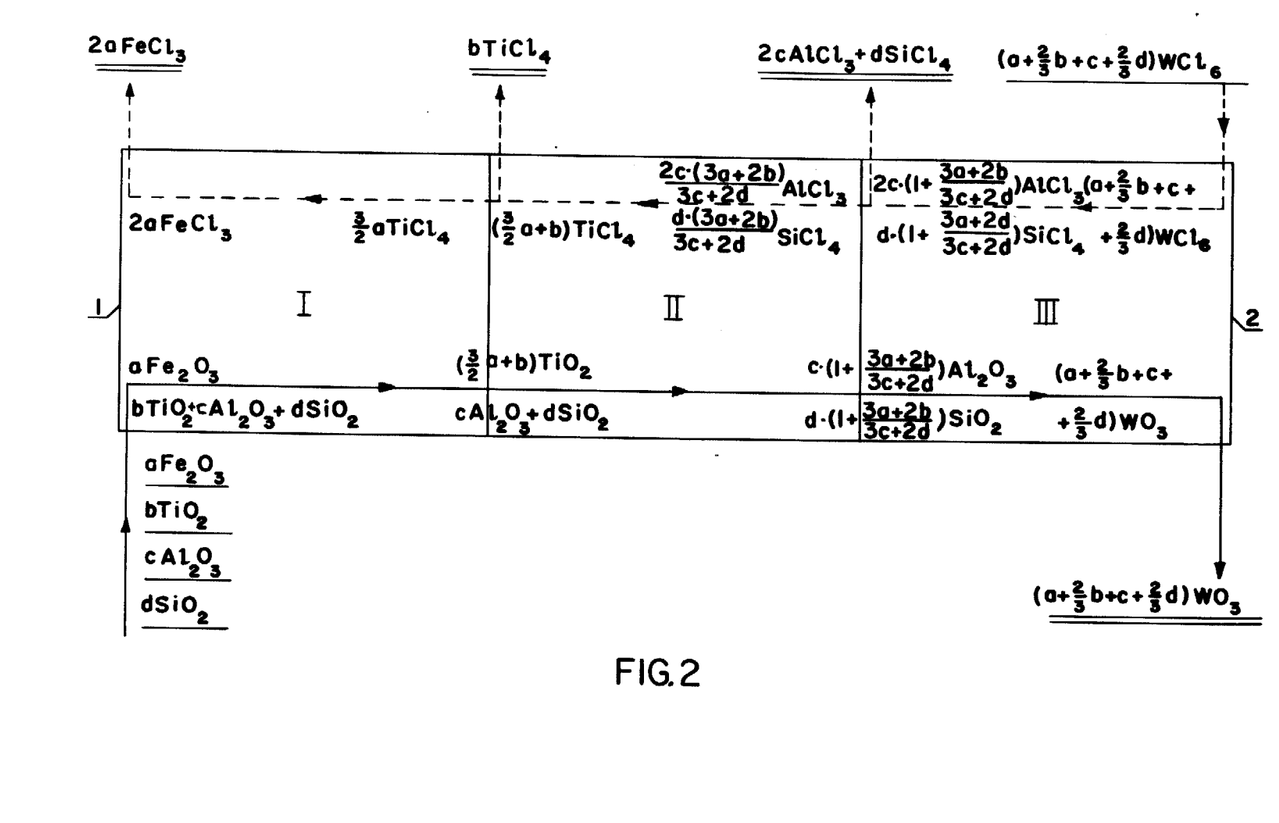
FIG. 2 is a view similar to FIG. 1, but illustrating a modification of the process.

To assist in the understanding of the process, it is in connection with an example (FIGS. 1 and 2). The quantities quoted are in moles. The series of decreasing halide-forming affinities of the elements in the mixture of oxides is: Fe, Ti, Al, Si. The word "unit" refers to an apparatus in which gaseous substances can be brought into contact with solid and/on molten material in counter-current flow; it can, for instance, refer to an upright tower or to several adjacent horizontal chambers (i.e. in cascade). The "front end" of the unit is always that end into which the working mixture of oxides is charged, whether the unit be vertical, horizontal or inclined:

The unit in FIG. 1 is made up of four zones I, II, III and IV. A dust consisting of $aFe_2O_3$, $bTiO_2$, $cAl_2O_3$ and $dSiO_2$ is introduced into the front end 1, and $(a + \frac{3}{2}b + c + \frac{3}{2}d)$ $WCl_6$-vapor is introduced into the back end 2. Wolfram has less of a halide forming affinity than silicium. Oxygen-halide-exchange reactions take place in the four zones where pure, gaseous halides are formed:

ZONE I:

$$aFe_2O_3(s) + \frac{3}{2} aTiCl_4(g) = 2aFeCl_3(g) + \frac{3}{2} aTiO_2(s)$$

ZONE II:

$$\left(\frac{3}{2}a + b\right) TiO_2(s) + \left(2a + \frac{4}{3}b\right) AlCl_3(g) =$$
$$(3a + b)TiCl_4(g) + (a + \frac{3}{2}b)Al_2O_3(s)$$

ZONE III:

$$(a + \frac{3}{2}b + c)Al_2O_3(s) + \left(\frac{3}{2}a + b + \frac{3}{2}c\right) SiCl_4(g) =$$

$$\left(2a + \frac{4}{3}b + 2c\right) AlCl_3(g) + \left(\frac{3}{2}a + b + \frac{3}{2}c\right) SiO_2(s)$$

ZONE IV:

$$\left(\frac{3}{2}a + b + \frac{3}{2}c + d\right) SiO_2(s) + (a + \frac{3}{2}b + c + \frac{3}{2}d)WCl_6(g) =$$

$$\left(\frac{3}{2}a + b + \frac{3}{2}c + d\right) SiCl_4(g) + (a + \frac{3}{2}b + c + \frac{3}{2}d)WO_3(s)$$

An equivalent proportion of the corresponding gaseous chloride (separated from the dust) of the oxide quantity introduced into the front end 1 is taken from every zone: from zone I: 2a $FeCl_3$; from zone II: b $TiCl_4$; from zone III: 2c $AlCl_3$; from zone IV: d $SiCl_4$ as well as the $WO_3$-dust formed there.

For instance, if one wants to extract two halides together from the unit, then, as can be seen from FIG. 2, only one zone is provided for the formation of this halide mixture. In this case the following reactions take place in the individual zones:

ZONE I:

$$aFe_2O_3(s) + \frac{3}{2} aTiCl_4(g) = 2aFeCl_3(g) + \frac{3}{2} aTiO_2(s)$$

ZONE II:

$$\frac{2c \cdot (3a + 2b)}{3c + 2d} AlCl_3(g) + \frac{d \cdot (3a + 2b)}{3c + 2d} SiCl_4(g) +$$

$$\left(\frac{3}{2}a + b\right) TiO_2(s) = \frac{c \cdot (3a + 2b)}{3c + 2d} Al_2O_3(s) +$$

$$\frac{d \cdot (3a + 2b)}{3c + 2d} SiO_2(s) + \left(\frac{3}{2}a + b\right) TiCl_4(g)$$

ZONE III:

$$\left[c + \frac{c \cdot (3a + 2b)}{3c + 2d}\right] Al_2O_3(s) +$$

$$\left[d + \frac{d \cdot (3a + 2b)}{3c + 2d}\right] SiO_2(s) +$$
$$(a + \frac{3}{2}b + c + \frac{3}{2}d)WCl_6(g) =$$

$$\left[2c + \frac{2c \cdot (3a + 2b)}{3c + 2d}\right] AlCl_3(g) +$$

$$\left[\frac{d + d \cdot (3a + 2b)}{3c + 2d}\right] SiCl_4(g) +$$

$$(a + \frac{3}{2}b + c + \frac{3}{2}d)WO_3(s)$$

The small parts of dimeric chlorides $Fe_2Cl_6(g)$ and $Al_2Cl_6(g)$ occurring in the zones I, II, and III respectively are ignored for the sake of simplicity.

Consequently according to the invention, the process for the selective production of individual pure halides and/or mixtures of halides from a mixture of solid oxides without reducing halogenation is characterized by the following steps.

(a) the comminuted mixture of oxides consisting of (a) $Fe_2O_3$, (b) $TiO_2$, (c) $Al_2O_3$ and (d) $SiO_2$, is loaded into the front end 1 of the unit which is divided into as many zones I, II, III, IV, as the number of halides or mixtures of halides to be produced;

(b) into the rear end of the unit, a halide is introduced of an element ($WCl_6$) which has a lower halide-forming affinity than that of the element with the lowest among the elements present whose halides are to be produced. The quantity of halide introduced $(a + \frac{2}{3}b + c + \frac{2}{3}d)$ $WCl_6$ is equivalent to the total halogen content of the halides to be extracted from the unit $2a\ Fe\ Cl_3 + b$ $TiCl_4 + 2c\ AlCl_3 + dSiCl_4$;

(c) the halide ($WCl_6$) introduced into the rear end of the unit and the solid oxide ($SiO_2$) (FIG. 1.) or mixture of oxides ($Al_2O_3 + SiO_2$) (FIG. 2.) arriving there are converted as a result of oxygen-halogen exchange to a solid oxide ($WO_3$) and a gaseous halide ($SiCl_4$) (FIG. 1.) or a mixture of halides ($AlCl_3$) + ($SiCl_4$) (FIG. 2.);

(d) the solid oxide ($WO_3$) formed at the rear end of the unit is separated from the gaseous halide ($SiCl_4$) or halide mixture ($AlCl_3 + SiCl_4$) and is removed from the unit;

(e) the gaseous halide ($SiCl_4$) (FIG. 1.) or halide mixture ($AlCl_3 + SiCl_4$) (FIG. 2.) formed at the rear end 2 of the unit, is brought into contact in counter-current flow with the mixture of solid oxides loaded into the front end 1 of the unit, thereby again producing through oxygen-halogen exchange in an individual gaseous halide or mixture of halides in every zone of the unit:

$AlCl_3$ in Zone III, $TiCl_4$ in zone II and $FeCl_3$ in zone I (FIG. 1.) or $AlCl_3 + SiCl_4$ in zone III, $TiCl_4$ in zone II and $FeCl_3$ in zone I (FIG. 2.)

(f) fractions of the gaseous halides or halide mixtures formed in the individual zones are separated from the solid oxides and extracted from the unit. The quantity extracted of the halide of each element is equivalent to the quantity of the oxide of that element loaded into the front end 1 of the unit: $2a\ Fe\ Cl_3$ corresponding to (a) $Fe_2O_3$, (b) $TiCl_4$ corresponding to (b) $TiO_2$, $2c\ AlCl_3$ corresponding to (c) $Al_2O_3$ and (d) $SiCl_4$ corresponding to (d) $SiO_2$.

In FIG. 2.
ZONE I: (as above)
ZONE II:

$2c\ \frac{(3a + 2b)}{3c + 2d}\ AlCl_3(g) + \frac{d(3a + 2b)}{3c + 2d}\ SiCl_4(g) +$ $\left(\frac{3}{2} a + b\right) TiO_2(s) = \frac{c(3a + 2b)}{3c + 2d} Al_2O_3(s) +$ $\frac{d(3a + 2b)}{3c + 2d} SiO_2(s) + \left(\frac{3}{2} a + b\right) TiCl_4(g)$

ZONE III:

$\left[c + \frac{c(3a + 2b)}{3c + 2d}\right] Al_2O_3(s) +$

-continued $\left[d + \frac{d(3a + 2b)}{3c + 2b}\right] SiO_2(s) +$ $\left(a + \frac{2b}{3} + c + \frac{2d}{3}\right) WCl_6(g) =$ $\left[2c + \frac{2c(3a + 2b)}{3c + 2d}\right] AlCl_3(g) +$ $\left[d + \frac{d(3a + 2b)}{3c + 2d}\right] SiCl_4(g) +$ $\left(a + \frac{2b}{3} + c + \frac{2d}{3}\right) WO_3(s)$ Since no reducing halogenation occurs in this mode of operation of the process, the halide gases extracted from the unit are neither diluted nor contaminated by oxides from the reducing agent, for example oxides of carbon and/or sulphur, so that after separation from the solid matter, they can be cooled into the solid or liquid state without any further special precautions.

In the example (FIGS. 1 and 2.), the halide ($WCl_6$) fed to the rear end of the unit 2 must be drawn continuously from a supply and the oxide ($WO_3$) formed there must be continuously removed. This condition can be advantageously achieved by subjecting the oxide ($WO_3$) removed from the rear end of the unit to a reducing halogenation with a halogen or halogen-containing gas or halogen-releasing compound and a reducing agent, separating out the halide ($WCl_6$) formed from the resulting mixture of gases (e.g. $WCl_6 + CO_2 + CO$) by a known method (e.g. condensation) and re-introducing it into the rear end of the unit.

Since, according to the invention, pure halides can be produced by a process which is technically elegant and very economical, a further advantage is the possibility of producing pure oxides or mixtures of oxides by—as occasion demands—oxidising a halide or individual halides or mixtures of halides, with oxygen or oxygen-containing gases or oxygen-releasing compounds by a known process and separating the resulting oxide or mixture of oxides from the halogens liberated.

The liberated halogens can be used advantageously again in the reducing halogenation of the oxide—e.g. $WO_3$ (FIG. 1.)—extracted from the rear end of the unit. The halide formed ($WCl_6$) is separated from the resultant gaseous mixture and is re-introduced into the rear end of the unit.

The usual thermodynamic equilibria of the oxygen-halogen exchange reactions lead to pure gaseous halides. In many cases, however, gaseous mixtures are formed in which a halide is adulterated with a quantity of another halide or oxy-halide—for example, in the reaction $5SiCl_4\ (g) + 2Nb_2O_5(s) = 5SiO_2(s) + 4NbCl_5(g)$ at 1,100° K. and 1 Atm. total pressure, a gaseous mixture is formed containing about 99.95% $NbCl_5$ by volume but also 0.05% $SiCl_4$ by volume.

The reaction $3SiCl_4(g) + 2Al_2O_3(s) = 3SiO_2(s) + 4AlCl_3\ (g)$ yields $AlCl_3$ and $Al_2Cl_6$ vapour which, according to the temperature and pressure can also contain 2 to 7% $SiCl_4$ by volume.

To produce a halide or halide mixture in pure form, it must be separated from the other gaseous matter either physically or chemically by a known method, preferably by fractional condensation or distillation.

However, since in many cases the usual accompanying material carries with it a residual part of the separated halide or halide mixture—depending on their vapour pressures and the method of separation—it is advantageous to recharge them into the unit to avoid losses.

In the example (FIGS. 1 and 2), a halide ($WCl_6$) is introduced into the rear end 2 of the unit and the corresponding oxide ($WO_3$) is discharged. As has already been shown, this halide can be produced again and again from the oxide by a reducing halogenation. However, it is more advantageous to subject the oxide ($WO_2$) (FIG. 1. IV) or the oxide mixture ($Al_2O_3 + SiO_2$) (FIG. 2. III) occurring in the final zone to a reducing halogenation and to pass the halide ($SiCl_4$) or halide-containing gaseous mixture ($AlCl_3 + Al_2Cl_6 + SiCl_4$) through the unit in counter-current flow to the oxides.

This technically and economically advantageous method of carrying out the process consists of the following steps:

(a) Instead of a halide, a reducing agent and a halogen or halogen-containing gas or halogen-releasing compound are introduced into the rear end of the unit in quantities equivalent to the total halogen content of the halides contained in the unit;

(b) The reducing agent and halogen are converted to a gaseous halide-containing mixture by the oxide or oxide mixture arriving at the rear end of the unit. This gaseous mixture is then reacted in counter-current flow with the mixture of oxides loaded into the unit.

(c) Fractions of the halide-containing gaseous mixtures present in the individual zones are separated from the oxides and removed from their respective zones, so that the quantity of halide of each element in the extracted gaseous mixture is equivalent to the quantity of oxide of that element loaded into the front end of the unit.

(d) Halides are separated from the gaseous mixtures freed by the oxides and removed from the individual zones.

Depending on the reducing agent used in the reducing halogenation, gaseous compounds are formed which dilute the gaseous halides produced, for example carbon, carbides and carbon halides yield $CO_2$ and $CO$; sulphur, sulphur halides and sulphides yield $SO_2$; phosphorus and phosphides yield phosphorus oxyhalides; hydrogen and dampness in the reducing agent and oxygen mixtures lead to the formation of hydrogen halides.

The halides to be produced can be separated from such gaseous contaminants in a known physical or chemical process according to their required use. They are isolated in their pure form preferably by fractional condensation or distillation.

However, considerable fractions of the halides produced can be carried away with the residual waste during separation, depending on their vapour pressures and the method of separation. To avoid waste, the process is carried out in such a way that the halide or mixture of halides is separated in a known way from the gaseous mixture extracted from a zone and the residue is returned to the unit.

In this embodiment of the process, pure oxides or mixtures of oxides can likewise be produced with one stage of reducing halogenation in a similar way as already previously described, inclusive of the reuse of the liberated halogen.

When several such reactions are related in a counter-current flow system, the temperatures more or less cancel each other out. It can happen, however, that this cancelling is not sufficient so that the temperature in one zone is too high and in another zone too low.

As a rule, halogenation chambers have to be lined with high temperature materials which are resistant to creep, abrasion, corrosion and changes in temperature at the prevailing temperatures, e.g. magnesium spinel (Mg $O.Al_2O_3$). However, such materials are not free from porosity and have a relatively low heat conductivity. Because of this, it is technically very difficult to supply heat to or remove heat from the individual zones through the walls of the reaction chamber.

There are already known proposals for producing the quantity of heat necessary for oxygen-halogen exchange reactions by admixing a corresponding quantity of carbon to the oxide mixture and introducing gaseous halogenation material (halides and/or halogens) together with oxygen or air. In this way the required amount of heat is generated by combustion of part of the carbon. However, this method has the disadvantage that additional carbon and oxygen are needed which significantly increases the amount of gas in the system and produces heat which must be removed for cooling the gaseous products and condensing the halide produced, not to mention the fact that not only the halogenation chamber but also the condensation vessel must be very voluminous. This method of controlling the temperature of the reaction is troublesome, distorts the chemisty of the process and affects its economics.

To lower the reaction temperature in the exothermic reducing chlorination of ores, it has already been proposed that cold chlorination wastes or other cold inert solid matter be admixed with the reacting mix.

In carrying out the process according to the invention—without or with only one stage of reducing halogenation—in which the temperatures of the individual zones interact and in which the heating effects in the individual zones differ from case to case depending on the qualitative and quantitative composition of the working mixture of oxides and the reducing agent as well as on the halogens used, one skilled in the art can determine mathematically, and in a known manner, how much and to or from which zones heat must be supplied or removed to achieve and control the required reaction temperatures.

Control of the reaction temperatures in the unit is thus achieved, according to the invention, by introducing solid, liquid or gaseous materials—including the working mixture of oxides, reducing agent and halogens—at appropriate temperatures and in corresponding quantities, at suitable points along the unit; cold materials to reduce the temperature and hot ones to increase it. Obviously the materials used must at least not interfere disadvantageously with the chemistry of the process.

For this purpose it is advantageous to use not only the sensible heat of the materials but also their latent heat and the heat of reaction; e.g. for cooling a mixture of solid NaCl and KCl in the molar ratio 1:1 (freezing point = 936° K.), cold liquid $SiCl_4$ (boiling point = 331° K.) liquified chlorine or solid calcium phosphate are introduced into the reducing halogenation zone, thereby forming calcium halide and phosphorus halide in a highly endothermic reaction; or for heating, calcium chloride vapour (boiling point = 1710° K., melting point = 1,044° K.) or molten sodium chloride (melting point = 1,074° K.). In other words, gaseous or liquid materials are added to the unit such that relatively small quantities either absorb or release much heat by melting and/or evaporation, or by condensation and/or solidification.

To conduct this method of temperature regulation in the most economic way, materials are used which, as far as possible, come from the output of the unit or of adjacent units; e.g. halogenation residues, halides, residual gases from the separation of halides, or materials arising from the production of oxides, in short, products arising during the course of the entire process.

As has already been shown, gaseous halides formed in the individual zones are, in the process described by the invention, mixed with other gases which are left over after the production of pure halides—e.g. by fractional condensation or distillation. In many cases these residual gases also contain fractions of the halides. To avoid waste, the residual gases are returned to the unit. It is particularly advantageous if these residual gases are returned to the next zone of the unit into which the gaseous mixture flows at a temperature and in a quantity regulated so as to produce the reaction temperature required in this next zone.

For this purpose, cold residual gases escaping from the distillation or condensation unit can be reheated by the hot gaseous mixture taken from the halogenation unit, e.g. in a heat exchanger. Consequently, no additional carbon and no fuel is necessary and the quantity of gas is not increased.

Figure 3:
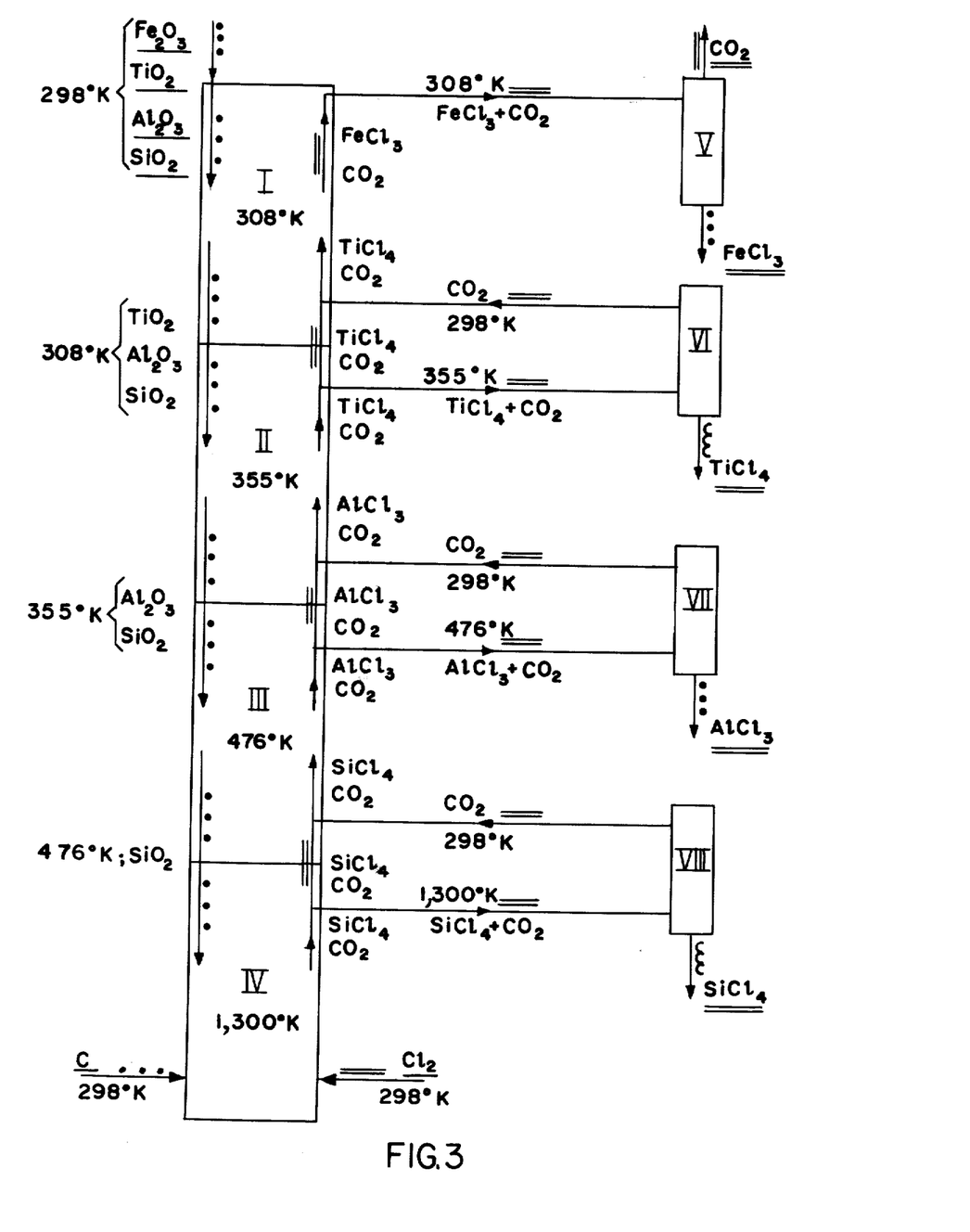
FIG. 3 is a schematic diagram of vertically oriented apparatus for practicing the invention according to a further embodiment.

These methods to hold the required reaction temperatures in the individual zones are made clearer by the following example. In FIG. 3, the unit is shown as an upright tower consisting of four zones, I, II, III and IV. A quantity of the gaseous mixture consisting of $CO_2$ and a halide equivalent to the oxide charge is extracted from each zone, the halide is condensed in one of the condensers V, VI, VII and VIII by cooling to 298° K. and the $CO_2$ is returned at a temperature of 298° K. to the zone following. The fraction of the gaseous mixture remaining in the tower flows directly to the next zone.

A cold, finely pulverised mixture of oxides is loaded into the top of zone I. The mixture has the following composition by weight percent:

$F_2O_3$: 3.137
$TiO_2$: 1.570
$Al_2O_3$: 32.477
$SiO_2$: 62.816

The required equivalent quantities of cold carbon and cold chlorine are fed into the lowest part of zone IV.

The solid matter drops down the tower while the gaseous mixture rises up through it. The reactions between the solid matter and the gaseous halides described previously take place in the individual zones. Pure chlorides are extracted from the condensers; solid $FeCl_3$ from V, liquid $TiCl_4$ from VI, solid $AlCl_3$ from VII and liquid $SiCl_4$ from VIII. The residual quantities of $CO_2$ are returned, at a temperature of 298° K., to the tower in the following manner: that from zone IV via condenser VIII to zone III, that from zone III via condenser VII to zone II and that from zone II via condenser VI to zone I. When the reaction temperatures existing in each zone are calculated thermodynamically, the following result is obtained:

Zone I . . . 308° K. (too low)
Zone II . . . 355° K. (too low)
Zone III . . . 476° K. (too low)
Zone IV . . . 1,300° K.

To achieve a reaction temperature of 1,000° K. in zones I, II and III (FIG. 4.), the oxide mixture must be fed in at a temperature of 1,032° K., and the quantities of $CO_2$ reintroduced into the zones must be reheated, e.g. in the counter-current flow heat exchangers IX, X, XI, by the gaseous mixture extracted from the tower, to the following temperatures:
from condenser VI to zone I . . . 900° K.
from condenser VII to zone II . . . 892° K.
from condenser VIII to zone III . . . 991° K.
The reaction temperature in zone IV then becomes 1,528° K.

Figure 4:
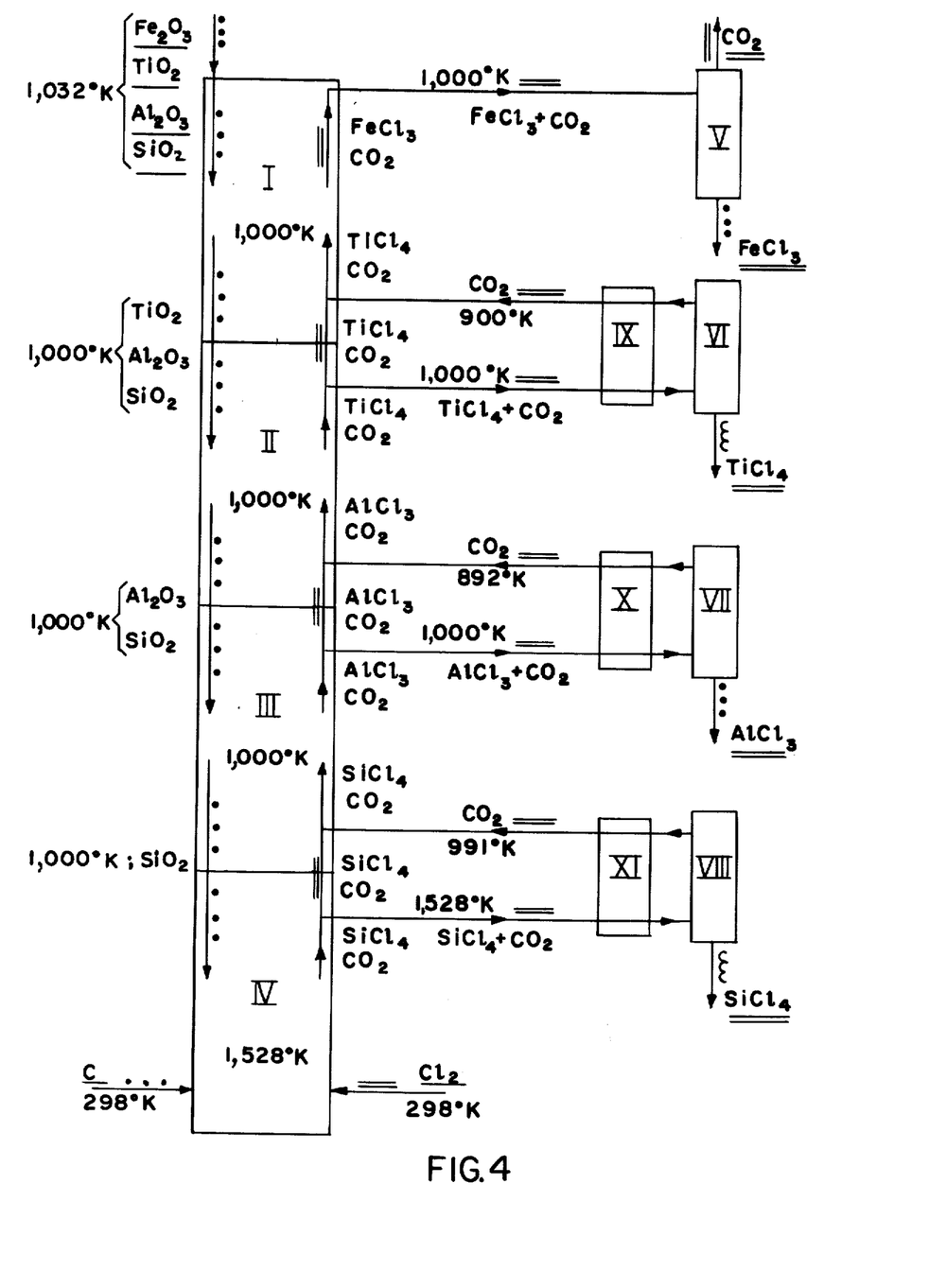
FIG. 4 is a view similar to FIG. 3, but illustrating a further embodiment of the invention.

The entire quantity of $CO_2$ leaving condenser VIII does not have to be used in zone III. A part of it can be tapped off for other purposes and the remainder, heated to a correspondingly higher temperature, is fed into zone III.

If it is required to maintain the temperature in zone I at only 560° K., it is only necessary to load the oxide mixture at a temperature of 712° K., but in this case solids and gases must first be brought into contact in counter-current flow in the upper part of zone I to allow temperatures to be equalised.

To control the temperature in zone IV to 1,000° K., either cold liquid $SiCl_4$ produced by condenser VIII, and/or liquified compressed chlorine can be added to this zone as heat absorbing media.

According to the composition of the working mixture of oxides and the reducing agent used, not only gaseous halides but also halides which are difficult to volatilise are formed. These are held in the solid or liquid state in the halogenation waste discharged from the rear end of the unit, e.g. alkali and alkaline earth halides, $MnBr_2$, $CoBr_2$, $CuCl_2$, $NiCl_2$. At the same time, the gaseous mixture leaving the front end of the unit can contain not only the halide to be produced, but also a number of other gases which remain as a residual gas mixture when the halide has been separated from it.

Neither the halogenation waste nor the residual gas can be thoughtlessly discharged to the atmosphere especially they may contain dangerous substances. The removal of such substances at the same time producing by-products such as phosphoric acid, sulphuric acid, sulphites, vanadium pentoxide, hydrohalidic acids, alkali hydroxides, alkaline earth carbonates, heavy metallic oxides or hydroxides etc., is already well known in connection with the halogenation process and can be used in this case.

When a solid, industrial, carbon-containing reducing agent is used for the reducing halogenation in the various embodiments of the process according to the invention, e.g. metallurgical coke, high temperature lignite coke or peat, which contain carbides, sulphides, phosphides or oxides of various elements such as iron, aluminium and silicon, the halides produced will be contaminated to a greater or lesser extent by the halides of these elements.

In contrast to the state of the art, the invention represents a surprisingly large step forward not only from technical, economic and industrial aspects, but also from environmental considerations. This is easily seen from the following examples:

To produce aluminium, many industrialised nations have to import bauxite from distant lands. In the Bayer process, pure alumina is first extracted from this as an intermediate product, but yielding at the same time red mud as waste, storage of which is one of the most unwelcome problems in the production of alumina (ground water pollution, cost of storage area). Since every tonne of alumina is associated with about 2 te of red mud, in 1976, in West Germany alone for example with a production of 1.3 million tonne of alumina, the enormous quantity of about 2.6 million tonne of red mud was produced, still containing 500,000 te of alumina as well as 600,000 te of iron oxide and 400,000 te of titanium oxide. Total world production of alumina at this time amounted to about 45 million tonne corresponding to about 90 million tonne of red mud.

According to the process described by the invention, pure $FeCl_3$ or $F_2O_3$ (pigment), pure $TiCl_4$ or $TiO_2$ (pigment) and pure $AlCl_3$ or $Al_2O_3$ can be produced in a single pass through the unit, from all the red mud newly arising from the production of alumina as well as that already accumulated in the vast storage heaps. These products, according to the state of the market, can be converted to iron, steel, metallic titanium and metallic aluminium by conventional methods.

As a result of the simple operation of this process, the production of additional quantities of aluminium as well as of iron and titanium, which have been lost up until now, is extremely lucrative, permits a drastic reduction in the importation of bauxite, rutile and ilemenite, eliminates the problem of storing red mud and guarantees a supply of raw material containing titanium.

In the future, however, it will not be necessary to produce red mud. On the contrary, avoiding the Bayer process, bauxite will be converted directly to $AlCl_3$ or $Al_2O_3$, $FeCl_3$ or $Fe_2O_3$, and $TiCl_4$ or $TiO_2$ by the process described in the invention. Furthermore, of special importance to the industrial economy is the production of $Al_2O_3$, $Fe_2O_3$ and $TiO_2$ from clay, which is also available in sufficiently large quantities in West Germany that no more bauxite will need to be imported.

The iron oxide powder produced can easily and economically be converted to iron or steel powder for sintering or to high purity complete steel alloys (free of sulphur, phosphorus and carbon).

According to the process described in the invention, halides or oxides, as required, can be produced in a manner which is technically elegant and very economic from poor quality and complex mixtures of oxidic, silicic, sulphidic and phosphoric ores, the smelting of which by classical methods is technically difficult, uneconomic and in environmental terms unacceptable. In addition, depending on the ores used, by-products are produced such as phosphoric, sulphuric and hydrochloric acids as well as compounds of vanadium, chromium, and manganese etc.

Such ores, for example, present in billion-tonne quantities are titanomagnetite, black sands and ilemenite. The smelting of these complex titanium-iron oxides by conventional methods is difficult and costly. At the present time, $TiO_2$ pigment is still largely produced by the sulphate process in which each tonne of $TiO_2$ is accompanied by 15 to 20 te of waste which is dumped into the sea. This untenable situation must, according to the new directives of the EEC Ministerial Council for Environmental Protection (1977), be abated by the end of 1980. The new process described by the invention also offers a technically simple and surprisingly economic method of providing pure iron oxide, pure titanium halides and $TiO_2$ pigment without endangering either air or water.

Since, in carrying out the process described in the invention, gaseous material is always separated from solid and/or molten materials, it is not necessary to achieve chemical equilibrium in aqueous solutions, or molten mixtures, processes which are always associated with relatively large losses and environmental pollution. Any carbon-containing material low in hydrogen content, or any sulphidic material can be used as reducing agents; no fall-resistant, pressure-resistant or abrasion-resistant metallurigal coke is needed. Since the units, like most chemical plant, are closed to the atmosphere and gas-tight and since very little solid and harmless waste matter (which can still be used if required) and only innocuous gases such as nitrogen, steam and carbon dioxide are left over, the process is decidedly harmless to the environment.

We claim:

1. A process for the selective production of individual pure halides and/or mixtures of halides from a mixture of solid oxides, either without or with only one single reducing halogenation stage using the known series of halide-forming affinities, characterised by the following features:
   (a) the comminuted mixture of solid oxides is loaded into the front end of a unit having as many zones as the number of halides or halide mixtures to be produced, and is passed through it;
   (b) into the rear end of the unit is fed a halide of an element with a lower halide-forming affinity than that of the lowest halide-forming affinity of those to be produced, whereby the quantity of halide supplied is equivalent to the total halogen content of the halides to be extracted from the units;
   (c) the halide fed into the rear end of the unit and the solid oxide or mixture of oxides arriving there are converted by oxygen-halogen exchange to a solid oxide and a gaseous halide or mixture of halides;
   (d) the solid oxide formed in the rear end of the unit is separated from the halide or mixture of halides and is removed from the unit;
   (e) the gaseous halide or mixture of halides formed in the rear end of the unit is brought in contact in counter-current flow with the solid oxide mixture further to the front of the unit whereby again through an oxygen-halogen exchange an individual gaseous halide or mixture of halides is formed in each zone of the unit; and
   (f) fractions of the gaseous halides or mixtures of halides formed in the individual zones are separated from the solid oxides and extracted from the unit in quantities such that the extracted amount of halide of each element is equivalent to the amount of oxide mixture loaded into the front end of the unit.

2. A process as claimed in claim 1, whereby the oxide removed from the rear end of the unit is subjected to a reducing halogenation with a halogen or halogen-containing gases or halogen-releasing compounds, and the halide formed is separated from the resulting gaseous mixture and is reintroduced into the rear end of the unit.

3. A process as claimed in claim 1 whereby the halide or mixture of halides to be produced is separated from the gaseous mixture extracted from a zone, by fractional condensation or distillation.

4. A process as claimed in claim 1 whereby the halide or mixture of halides to be produced is separated in a known manner from the gaseous mixture extracted from a zone, and the residual waste is reintroduced into the unit.

5. A process as claimed in claim 1 characterised by the following features:

(a) instead of a halide, a reducing agent and a halogen or halogen-containing gas or halogen-releasing compound are fed into the rear end of the unit in quantities equivalent to the total halogen content of the halides extracted from the unit;

(b) reducing agent and halogen are converted by the oxide or mixture of oxides arriving at the rear end of the unit to a gaseous halide-containing mixture which is reacted in counter-current flow with the mixture of oxides loaded into the unit;

(c) fractions of the halide-containing gaseous mixtures present in the individual zones are separated from the oxides and are extracted from the respective zones in quantities such that the quantities of the halides of every element contained in the gaseous mixtures are equivalent to the quantities of their oxides loaded into the front end of the Unit;

(d) the halides are separated from the gaseous mixture extracted from each individual zone and thus freed from the oxides.

6. A process as claimed in claim 5, whereby the halide or mixture of halides contained in the gaseous mixture extracted from a zone is separated by fractional condensation or distillation.

7. A process as claimed in claim 5 whereby the halide or mixture of halides contained in the gaseous mixture extracted from a zone is separated in a known manner and the residual gas is reintroduced into the unit.

8. A process as claimed in claim 1 whereby appropriate quantities of materials having at least no deleterious effect on the chemistry of the process are introduced at corresponding temperatures through suitable points of access to the unit for the purpose of controlling the temperature of the reactions.

9. A process as claimed in claim 5 whereby appropriate quantities of materials having at least no deleterious effect on the chemistry of the process are introduced at corresponding temperatures through suitable points of access to the unit for the purpose of controlling the temperature of the reactions.

10. A process as claimed in claim 8 whereby solid or liquid matter is introduced into the unit thereby absorbing heat by melting and/or evaporating.

11. A process as claimed in claim 9 whereby solid or liquid matter is introduced into the unit thereby absorbing heat by melting and/or evaporating.

12. A process as claimed in claim 8 whereby gaseous or liquid matter is introduced into the unit thereby releasing heat by condensing and/or solidifying.

13. A process as claimed in claim 9 whereby gaseous or liquid matter is introduced into the unit thereby releasing heat by condensing and/or solidifying.

14. A process as claimed in claim 8 whereby the materials used for temperature control are taken from the output of the entire process.

15. A process as claimed in claim 9 whereby the materials used for temperature control are taken from the output of the entire process.

16. A process as claimed in claim 5 whereby the halide or mixture of halides contained in a fraction of the gaseous mixture extracted from a zone is separated and the residual gaseous waste is returned to the next zone of the unit where it rejoins the gaseous mixture in the zone, and in which the temperature and quantity of waste gas returned is regulated so that the required reaction temperature is obtained in the next zone.

17. A process as claimed in claim 16 whereby the returned waste gases are reheated by a hot gaseous mixture extracted from the halogenation vessel.

* * * * *